(12) United States Patent
Mattijetz

(10) Patent No.: US 6,330,107 B1
(45) Date of Patent: Dec. 11, 2001

(54) MULTI-IMAGE DISPLAY SCREEN

(76) Inventor: Danny Mattijetz, 634 Tressy Ave., Glendora, CA (US) 91740

( * ) Notice: Subject to any disclaimer, the term of this patent is extended or adjusted under 35 U.S.C. 154(b) by 0 days.

(21) Appl. No.: 09/262,205

(22) Filed: Mar. 4, 1999

(51) Int. Cl.$^7$ .......................... G03B 21/60; G02B 27/10; G02F 1/1335
(52) U.S. Cl. ........................... 359/456; 359/619; 349/57
(58) Field of Search ........................... 359/453, 456, 359/619, 625, 626; 349/57

(56) References Cited

U.S. PATENT DOCUMENTS

| | | | |
|---|---|---|---|
| 1,918,705 | * 7/1933 | Ives | 359/619 |
| 3,299,203 | * 1/1967 | Gil De Gibaja | 178/5.4 |
| 3,552,822 | * 1/1971 | Altman | 359/453 |
| 3,565,733 | * 2/1971 | Leach | 359/626 |
| 4,634,220 | * 1/1987 | Hockert et al. | 359/626 |
| 5,241,416 | * 8/1993 | Mitsutake et al. | 359/456 |
| 5,563,738 | * 10/1996 | Vance | 359/614 |
| 6,172,814 | * 1/2001 | Watanabe et al. | 359/619 |

* cited by examiner

Primary Examiner—Christopher E. Mahoney

(57) ABSTRACT

A display system is provided including a display with a plurality of cells each adapted to emit a portion of an image. The display has a front face with a matrix of semi-spherical depressions formed therein. A bottommost point in each depression is centrally positioned above one of the cells of the display. A plurality of transparent spheres are positioned within the depressions for affording a visual effect.

2 Claims, 2 Drawing Sheets

MULTI-IMAGE DISPLAY SCREEN

BACKGROUND OF THE INVENTION

1. Field of the Invention

The present invention relates to optical displays and more particularly pertains to a new multi-image display screen for affording a visual effect with a two dimension display.

2. Description of the Prior Art

The use of optical displays is known in the prior art. More specifically, optical displays heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 2,756,363; 2,086,556; 5,717,453; 4,526,439; 5,258,833; and U.S. Pat. No. Des. 347,003 which are each incorporated herein by reference.

In these respects, the multi-image display screen according to the present invention substantially departs from the conventional concepts and designs of the prior art, and in so doing provides an apparatus primarily developed for the purpose of affording a visual effect with a two dimension display.

SUMMARY OF THE INVENTION

In view of the foregoing disadvantages inherent in the known types of optical displays now present in the prior art, the present invention provides a new multi-image display screen construction wherein the same can be utilized for affording a visual effect with a two dimension display.

The general purpose of the present invention, which will be described subsequently in greater detail, is to provide a new multi-image display screen apparatus and method which has many of the advantages of the optical displays mentioned heretofore and many novel features that result in a new multi-image display screen which is not anticipated, rendered obvious, suggested, or even implied by any of the prior art optical displays, either alone or in any combination thereof.

To attain this, the present invention is adapted for use with, but not limited to, a liquid crystal display having a plurality of cells which emit a portion of an image. A screen is provided that includes a transparent sheet having a front face, a rear face, and a periphery formed therebetween. The periphery is equipped with a size and shape similar to that of the liquid crystal display. The front face of the sheet has a matrix of abutting hemi-spherical protrusions each integrally coupled thereto and extending therefrom about an axis normal with respect to the front face. It should be noted that the hemi-spherical protrusions have a predetermined radius of curvature. As shown in FIG. 3, the rear face of the sheet has a plurality of semi-spherical protrusions each integrally coupled thereto and extending therefrom about the axis of one of the hemi-spherical protrusions. The semi-spherical protrusions each have a predetermined radius of curvature greater than that of the hemi-spherical protrusions. In use, the sheet is adapted for being removably positioned over the liquid crystal display. When in place, each of the axes of the sheet are in alignment with one of the plurality of the cells of the liquid crystal display.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new multi-image display screen apparatus and method which has many of the advantages of the optical displays mentioned heretofore and many novel features that result in a new multi-image display screen which is not anticipated, rendered obvious, suggested, or even implied by any of the prior art optical displays, either alone or in any combination thereof.

It is another object of the present invention to provide a new multi-image display screen which may be easily and efficiently manufactured and marketed.

It is a further object of the present invention to provide a new multi-image display screen which is of a durable and reliable construction.

An even further object of the present invention is to provide a new multi-image display screen which is susceptible of a low cost of manufacture with regard to both materials and labor, and which accordingly is then susceptible of low prices of sale to the consuming public, thereby making such multi-image display screen economically available to the buying public.

Still yet another object of the present invention is to provide a new multi-image display screen which provides in the apparatuses and methods of the prior art some of the advantages thereof, while simultaneously overcoming some of the disadvantages normally associated therewith.

Still another object of the present invention is to provide a new multi-image display screen for affording a visual effect with a two dimension display.

Even still another object of the present invention is to provide a new multi-image display screen that includes a display with a plurality of cells each adapted to emit a portion of an image. The display has a front face with a matrix of semi-spherical depressions formed therein. A bottommost point in each depression is centrally positioned above one of the cells of the display. A plurality of transparent spheres are positioned within the depressions for affording a visual effect.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
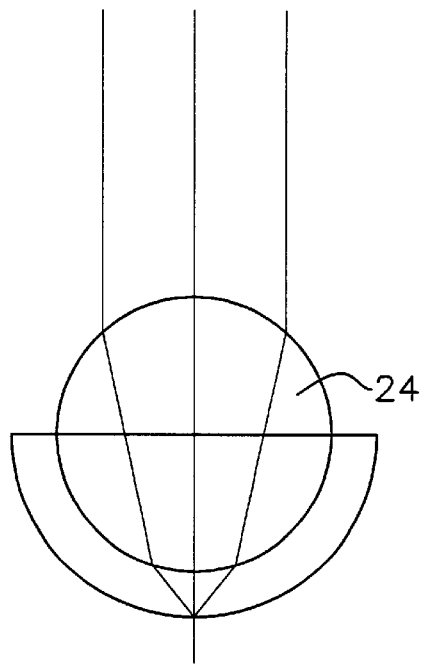
FIG. 1 is a side cross-sectional view of one of the embodiments of the present invention.
Figure 2:
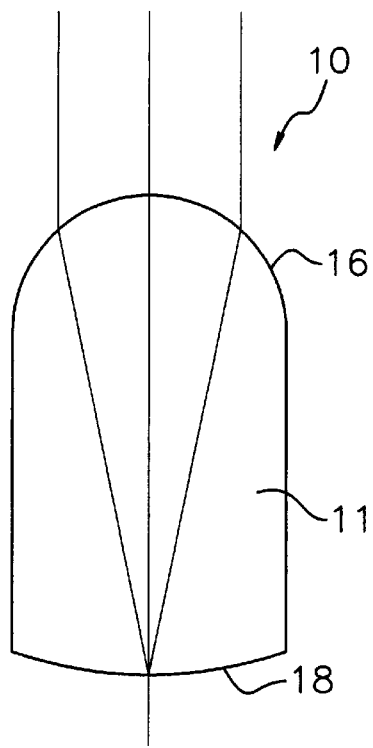
FIG. 2 is a side cross-sectional view of another one of the embodiments of the present invention.

With reference now to the drawings, and in particular to FIGS. 1 through 5 thereof, a new multi-image display screen embodying the principles and concepts of the present invention and generally designated by the reference numeral 10 will be described.

The present invention, designated as numeral 10, is a screen 11 adapted for use with a liquid crystal display 12 or any other type of flat or arcuate, static or dynamic display having a plurality of cells which depict a portion of an image. The screen includes a transparent sheet having a front face, a rear face, and a periphery formed therebetween. The periphery is equipped with a size and shape similar to that of the liquid crystal display. The front face of the sheet has a matrix of abutting hemi-spherical protrusions 16 each integrally coupled thereto and extending therefrom about an axis normal with respect to the front face. It should be noted that the hemi-spherical protrusions have a predetermined radius of curvature.

Figure 3:
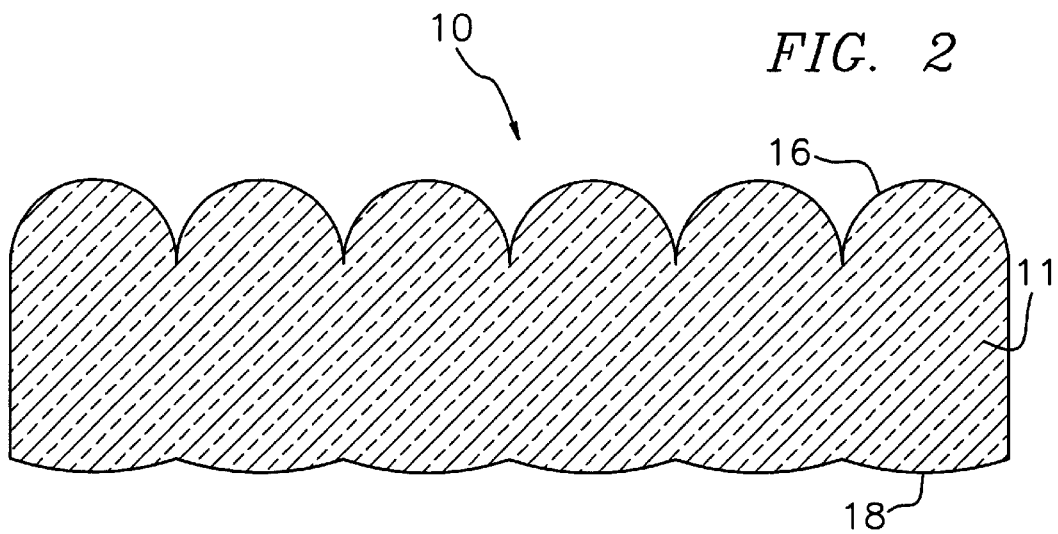
FIG. 3 is a side cross-sectional view of one of the embodiments of the present invention shown in FIG. 2.

As shown in FIG. 3, the rear face of the sheet has a plurality of semi-spherical protrusions 18 each integrally coupled thereto and extending therefrom about the axis of one of the hemi-spherical protrusions. In most cases, the semi-spherical protrusions each have a predetermined radius of curvature greater than that of the hemi-spherical protrusions. It should be noted that such radius is determined by the refractive index of the material used. As such, with a highly refractive materials, the semi-spherical protrusions may each have a predetermined radius of curvature less than that of the hemi-spherical protrusions. In either case, the radius of curvature of each of the hemi-spherical protrusions is concentric with that of each of the semi-spherical protrusions.

In use, the sheet is adapted for being removably positioned over the liquid crystal display. It should be understood that the display may take on various other forms and applications such as a traffic light or the like. When in place, each of the axes of the sheet are in alignment with one of the plurality of the cells of the liquid crystal display. As such, the protrusions on the front and rear faces of the sheet afford a plurality of side-by-side lenses like the one shown in FIG. 2. In various embodiments, the foregoing lenses may be glued, integrally formed, or otherwise attached to form the matrix which is shown in FIG. 3. By this structure, the screen allows 3-D images to be seen without need for additional glasses or a personal viewing apparatus and with optical parallax techniques. Further, the sheet may be capable of displaying multiple images based on the angle of viewing. In addition, the cells of the display may be manipulated in a way to work in conjunction with the effects of the sheet for improved operation.

Figure 4:
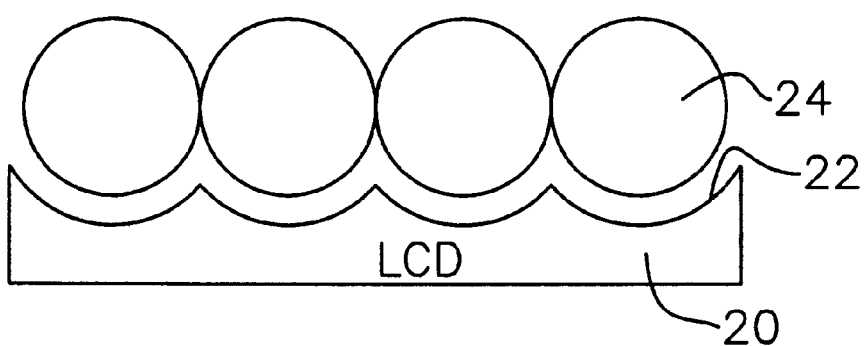
FIG. 4 is a side cross-sectional view of one of the embodiments of the present invention shown in FIG. 1.
Figure 5:
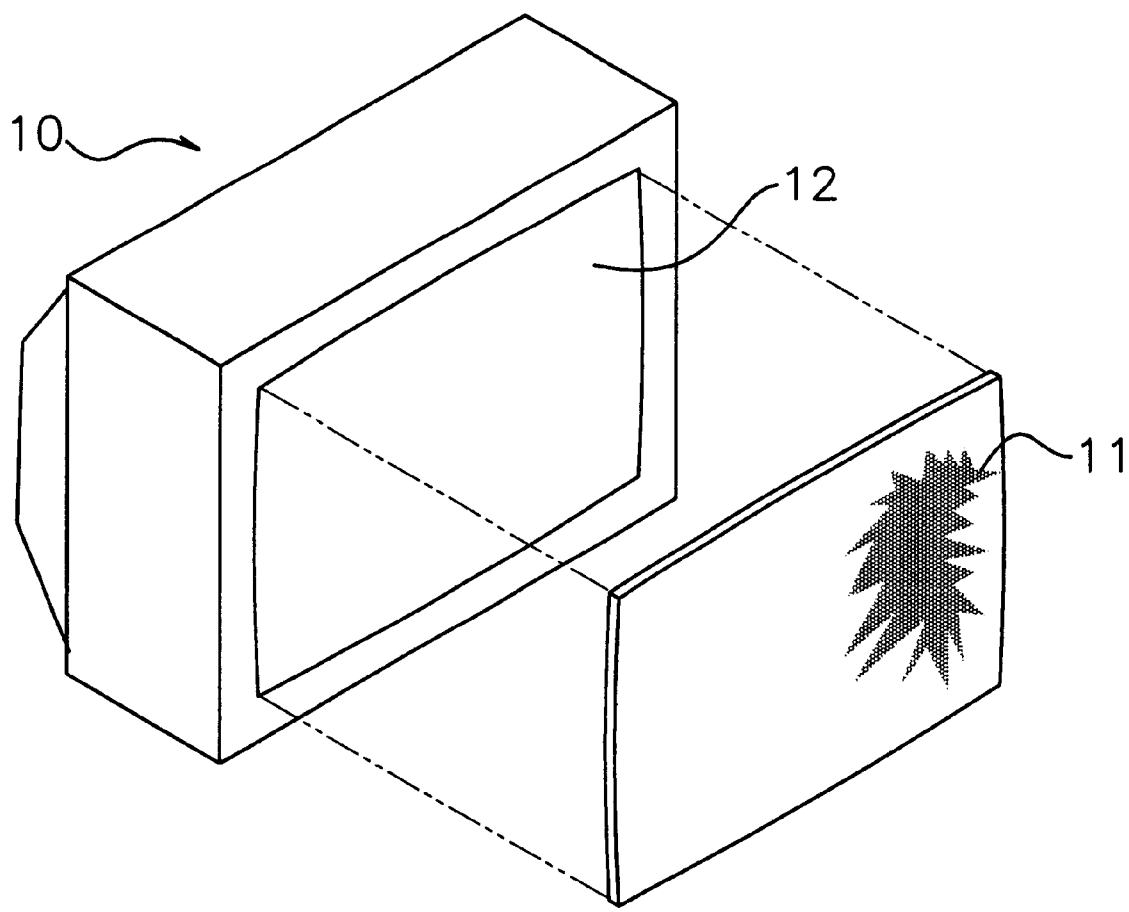
FIG. 5 is a perspective of one of the embodiments of the present invention featured in FIGS. 2 & 3.

In an alternate embodiment featured in FIGS. 1 & 4, a display 20 is provided with a plurality of cells each adapted to emit a portion of an image. The display has a front face with a matrix of semi-spherical depressions 22 formed therein. It should be noted that a bottommost point in each depression is centrally positioned above one of the cells of the display. The present embodiment, a plurality of transparent spheres 24 are positioned within the depressions, as shown in FIG. 4. Ideally, the spheres are spaced from the respective depression by any desired transparent medium, as shown in FIG. 4.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An optical screen system, comprising:
   a liquid crystal display with a plurality of cells which emit a portion of an image;
   an optical screen comprising:
   a transparent sheet including a front face, a rear face, and a periphery formed therebetween with a size and shape similar to that of the liquid crystal display, the front face of the sheet having a matrix of abutting hemi-spherical protrusions each integrally coupled thereto and extending therefrom about an axis normal with respect to the front face, the hemi-spherical protrusions having a predetermined radius of curvature, the rear face of the sheet having a plurality of semi-spherical protrusions each integrally coupled thereto and extending therefrom about the axis of one of the hemi-spherical protrusions, the semi-spherical protrusions having a predetermined radius of curvature greater than that of the hemi-spherical protrusions;

wherein the sheet is removably positioned over the liquid crystal display such that each of the axes of the sheet are in substantial alignment with one of the plurality of the cells of the liquid crystal display.

2. A display system comprising:

a display having a plurality of cells each depicting a portion of an image;

a screen removably mounted on the display, the screen comprising:

a plurality of protrusions extending from the display, wherein each of the protrusions are in alignment with one of the cells of the display;

wherein the protrusions are positioned within depressions formed in the display wherein the protrusions are connected to form a sheet wherein the protrusions are substantially hemispherical.

* * * * *